United States Patent
Koop et al.

(10) Patent No.: US 9,527,557 B2
(45) Date of Patent: Dec. 27, 2016

(54) METHOD FOR ACTIVELY DAMPING A SHIP'S MOTION AS WELL AS SUCH AN ACTIVE ROLL STABILISATION SYSTEM

(71) Applicants: Quantum Controls B.V., Nuth (NL); Rotorswing Marine B.V., Tilburg (NL)

(72) Inventors: Mattheus Theodorus Koop, Nuth (NL); Lambertus Johannes Maria Dinnissen, Eindhoven (NL)

(73) Assignees: Quantum Controls B.V., Nuth (NL); Rotorswing Marine B.V., Tilburg (NL)

( * ) Notice: Subject to any disclaimer, the term of this patent is extended or adjusted under 35 U.S.C. 154(b) by 0 days.

(21) Appl. No.: 14/628,722

(22) Filed: Feb. 23, 2015

(65) Prior Publication Data

US 2015/0239534 A1   Aug. 27, 2015

(51) Int. Cl.
*B63B 39/06* (2006.01)
*B63B 1/34* (2006.01)

(52) U.S. Cl.
CPC ............... *B63B 39/06* (2013.01); *B63B 1/34* (2013.01); *B63B 2039/065* (2013.01); *B63B 2039/066* (2013.01)

(58) Field of Classification Search
CPC ............... B63B 39/06; B63B 1/28; B63B 1/34
USPC .......................................................... 114/126
See application file for complete search history.

(56) References Cited

U.S. PATENT DOCUMENTS

| | | | | |
|---|---|---|---|---|
| 3,020,869 A | * | 2/1962 | Beach | B63B 39/06 114/126 |
| 3,467,043 A | * | 9/1969 | Bowles | B63B 1/248 114/126 |
| 2005/0145151 A1 | * | 7/2005 | Koop | B63B 39/06 114/126 |
| 2011/0017114 A1 | * | 1/2011 | Koop | B63B 39/06 114/122 |

FOREIGN PATENT DOCUMENTS

NL          1023921        1/2005

\* cited by examiner

*Primary Examiner* — Stephen Avila
(74) *Attorney, Agent, or Firm* — Wood, Phillips, Katz, Clark & Mortimer

(57) ABSTRACT

The invention relates to a method and device for actively damping a ship's motion while the ship is sailing including driving at least one first rotatable damping element that extends from the ship's hull, below the water line, on a side of the ship.

According to the invention, the method is characterized by the steps of:

i) sensing the ship's motion and sailing speed,
ii) generating and delivering control signals on the basis of step i),
iii) rotatably driving the stabilization elements on the basis of step ii),
iv) determining, on the basis of step i), the current frictional resistance experienced by the stabilization elements at the sensed motion and sailing speed of the ship, (Continued)

(a)          (b)          (c)          (d)

v) setting the stabilization element at an angle relative to a longitudinal axis of the ship on the basis of the determined current frictional resistance and a desired minimum frictional resistance.

9 Claims, 5 Drawing Sheets

METHOD FOR ACTIVELY DAMPING A SHIP'S MOTION AS WELL AS SUCH AN ACTIVE ROLL STABILISATION SYSTEM

BACKGROUND OF THE INVENTION

1. Field of the Invention

The invention relates to a method for actively damping a ship's motion while the ship is sailing by driving at least one first rotatable damping element that extends from the ship's hull, below the water line, on a side of the ship.

The invention also relates to a device for actively damping a ship's motion, comprising at least one first rotatable damping element extending from the ship's hull, below the water line, on a side of the ship, sensor means for sensing the ship's motion and delivering control signals on the basis thereof, driving means for rotatably driving the stabilisation element on the basis of the control signals being delivered for the purpose of damping the ship's motion being sensed.

2. Background Art

Such an active stabilisation system for damping a ship's motion is known, for example from NL patent No. 1023921. In said patent it is proposed to rotate a stabilisation element that projects into the water from the ship's hull below the waterline about its longitudinal axis so as to compensate for the ship's roll while the ship is stationary. The ship is for that purpose fitted with sensor means, for example angle sensors, speed sensors and acceleration sensors, by means of which the angle, the speed or the acceleration of the roll are sensed. Control signals are generated on the basis of the data being obtained, which signals control the rotation of the rotatable stabilisation element as regards the direction of rotation and the speed of rotation of the stabilisation element as well as the movement of the stabilisation element relative to the ship.

Under the influence of the rotational movement of the stabilisation element and the water flowing past as a result of the stabilisation element moving relative to the stationary ship, a correction force perpendicular to the direction of rotation and the ship's direction of movement is generated. This physical phenomenon is also referred to as the Magnus effect, on the basis of which the correction force is used for opposing the ship's roll.

A drawback of the stabilisation system according to said Dutch patent is that it can only be used while the ship is stationary. If such an active stabilisation system is used with ships while sailing, the system will be opposed by the increased frictional resistance on the one hand and by the mass inertia of the system, because the direction of rotation of the stabilisation elements needs to be reversed all the time, on the other hand.

SUMMARY OF THE INVENTION

Accordingly it is an object of the invention to provide a method and an active system for stabilising a ship's motion as described in the introduction which can only be used with ships while sailing. According to the invention, the method is characterised by the steps of:
i) sensing the ship's motion and sailing speed,
ii) generating and delivering control signals on the basis of step i),
iii) rotatably driving the stabilisation elements on the basis of step ii),
iv) determining, on the basis of step i), the current frictional resistance experienced by the stabilisation elements at the sensed motion and sailing speed of the ship,
v) setting the stabilisation element at an angle relative to a longitudinal axis of the ship on the basis of the determined current frictional resistance and a desired minimum frictional resistance.

By using the method according to the invention, the one or more stabilisation elements will not remain positioned at an angle of at most 90° relative to the ship's direction of movement—as is usual—but said angle relative to the ship's direction of movement is constantly varied in dependence on the sailing speed and the desired roll stabilisation.

As a result, the active stabilisation system is constantly set so that the stabilisation elements will experience the least possible frictional resistance while the ship is sailing.

In a further elaboration of the method according to the invention, wherein the at least one rotatable stabilisation element has a wing shape, the method comprises the further steps of:
at sailing speeds of the ship lower than a reference sailing speed
vi) driving the stabilisation element at a rotational speed of more than 0 rpm, or
at sailing speeds of the ship higher than the reference sailing speed
vii) driving the stabilisation element at a rotational speed equal to 0 rpm, and
viii) pivoting the non-rotating stabilisation element to and fro.

This makes it possible to realise an active roll stabilisation system which will experience even less resistance during various operating or sailing conditions. The resistance from the water is further minimised by using a stabilisation element having owing shape. Such awing-shaped stabilisation element will experience a minimum amount of resistance in the "feathering" (i.e. non-rotating) position at high sailing speeds, whilst at low sailing speeds the wing-shaped stabilisation element will assume a virtual cylindrical shape by rotating, so that the intended Magnus effect is created.

More specifically, the method is further characterised in that the step viii) of pivoting the non-rotating stabilisation element to and fro takes place between −20° and +20°.

The object of the invention is therefore to provide an active system for stabilising a ship's motion as described in the introduction which can primarily be used with ships while sailing. According to the invention, the active stabilisation system is for that purpose characterised in that moving means are provided, which moving means position or set the stabilisation element at an angle relative to a longitudinal axis of the ship on the basis of the delivered control signals and the speed of the ship so as to realise a minimal resistance while the ship is sailing.

In a specific embodiment of the invention, by means of which a minimal resistance is realised in use, the stabilisation element has a wing shape.

According to a very functional embodiment of the invention, the sensor means are designed to determine the current sailing speed and comparing said current sailing speed with a reference sailing speed and delivering control signals to the driving means and the moving means, respectively, on the basis of this comparison, such that if the current sailing speed is lower than the reference sailing speed, the driving means will drive the stabilisation element at a rotational speed of more than 0 rpm, and that if the current sailing speed is higher than the reference sailing speed, the driving means will drive the stabilisation element at a rotational speed equal to 0 rpm and the moving means will pivot the non-rotating stabilisation element to and fro.

As a result of this additional functionality of the active stabilisation system, the system can be quickly and efficiently adjusted in dependence on changing sailing conditions, so that on the one hand adequate corrections are constantly made for the ship's motion whilst on the other hand the ship will experience a minimum resistance from the water.

In another embodiment, the stabilisation element is according to the invention connected to the ship by means of a universal joint.

The stabilisation element may optionally be accommodated in a guide formed in or on the ship's hull, which guide preferably extends at last in part in the longitudinal direction of the ship.

In a specific embodiment of a stabilisation system according to the invention, the at least one rotatable stabilisation element can only rotate in one direction.

According to another functional embodiment, stabilisation elements may be provided on either longitudinal side of the ship or only on one side, whilst in another embodiment two or more stabilisation elements are provided at the front side of the ship.

BRIEF DESCRIPTION OF THE DRAWINGS

The invention will now be explained in more detail with reference to a drawing, in which.

DETAILED DESCRIPTION OF THE PREFERRED EMBODIMENT

Figure 1:
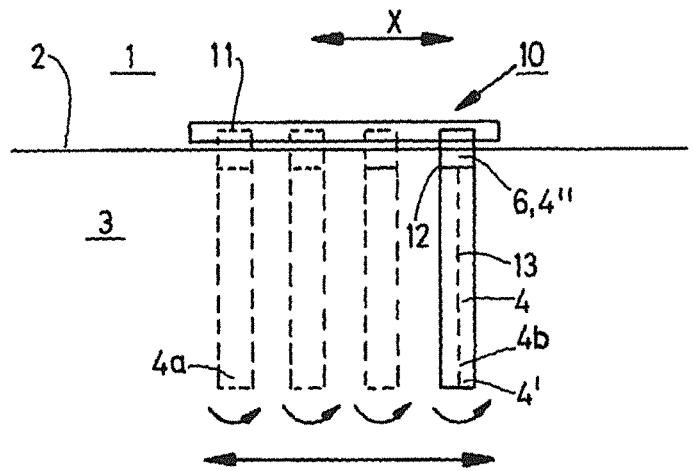
FIGS. 1-4 are views of active roll stabilisation systems according to the prior art.

In FIGS. 1-4 embodiments of prior art active stabilisation systems for use with stationary ships are shown. The stationary ship 1 floating on a water surface 3 is provided with an active stabilisation system indicated by reference numerals 10-11-20-10'-20'. This known active system for stabilising for a ship's motion as described in Dutch patent No. 1023921 is made up of rotatable stabilisation elements 4a and 4b, respectively, which each extend from a respective longitudinal side of the hull 2 of the ship below the water line.

The prior art active stabilisation system also comprises sensor means (not shown) for sensing the ship's motion, more in particular the ship's roll. On the basis of the sensing results, control signals are delivered to driving means (likewise not shown), which rotatably drive either one of the stabilisation elements 4a or 4b (depending on the correction to be carried out). Said sensor means may consist of angle sensors, speed sensors or acceleration sensors, which continuously sense the angle of the ship relative to the horizontal water surface 3 and the speed or the acceleration caused by the ship's roll.

FIG. 1 shows an embodiment of a known active stabilisation system provided with a set of rotatable stabilisation elements. The active stabilisation system comprises moving means which move the rotatable stabilisation element 4 with respect to the stationary ship. More particularly, FIG. 1 shows an embodiment in which the moving means 10 impart a reciprocating translational movement between two extreme positions 4a and 4b to the rotatable stabilisation element, such that said movement comprises at least a component in the longitudinal direction of the ship. The longitudinal direction of the ship is indicated by the wide arrow X in FIG. 1.

In the case of the translating embodiment of the active stabilisation system shown in FIG. 1 (see also FIG. 2), the translational movement of the rotatable stabilisation element 4 is made possible in that a guide 11 is mounted in the hull 2 of the ship 1, along which guide the stabilisation element 4 can be moved. The rotatable stabilisation element 4 is for that purpose accommodated in the guide 11 with its one end 4' via a universal joint 12, so that translational movement in the guide 11 on the one hand and a rotational movement about the longitudinal axis 13 on the other hand are possible.

Although this is schematically shown, the rotatable stabilisation element 4 is connected to the driving means 6 by means of a universal joint 12, which driving means rotatably drive the stabilisation element 4 for the purpose of damping the ship's motion being sensed. In this embodiment, the assembly of the driving means 6 and the universal joint 12 (which enables the stabilisation element 4 to rotate with respect to the driving means 6 and the ship 1) can translate along the guide 11, for example via a rack-and-pinion transmission mechanism (not shown).

Also other translational transmission mechanisms can be used for this purpose, however.

The reciprocating translational movement of the rotatable stabilisation element 4 in the guide 11, between the extreme positions 4a and 4b, in the longitudinal direction X of the stationary ship 1 combined with the rotational movement of the stabilisation element 4 results in a reactive force, also referred to as the Magnus force. This force is perpendicular both to the direction of movement of the stabilisation element 4 in the X-direction and to the direction of rotation thereof.

Depending on the direction of the ship's motion (the ship's roll) to be damped, the direction of rotation of the stabilisation element 4 must be selected so that the resulting Magnus force $F_M$ will oppose the rolling force $F_R$ being exerted on the stationary ship as a result of the ship's roll.

Figure 2:
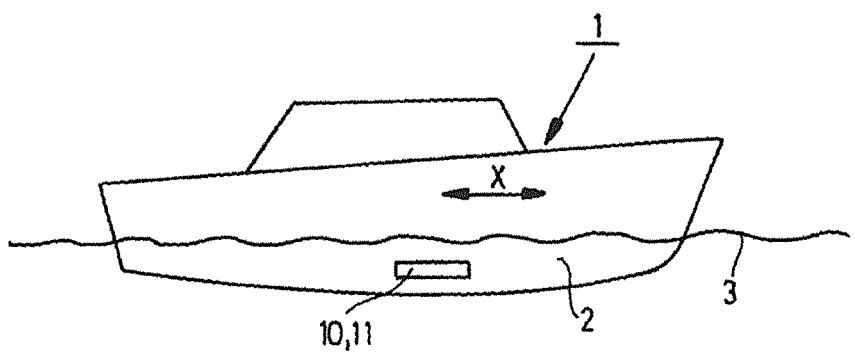
Figure 3:
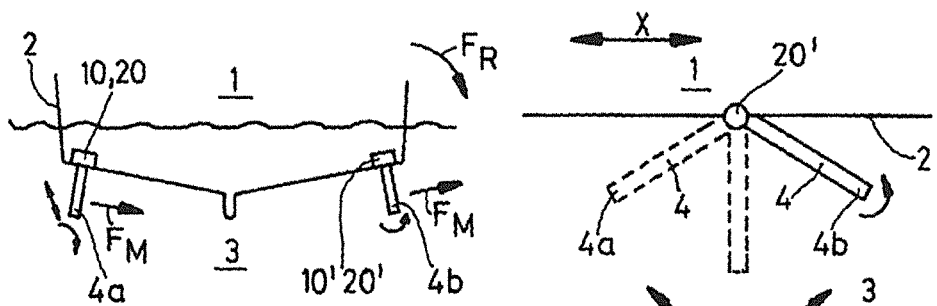

This is shown in FIG. 3, in which the translating rotatable stabilisation elements 4a-4b are disposed below the water line 3, near the centre of the ship (see FIG. 2). The direction, the speed as well as the acceleration of the rolling motion can be sensed in a manner which is known per se, using suitable sensor means (angle sensor, speed sensor and acceleration sensor). Control signals are delivered on the basis thereof to the respective driving means 6 and 10. On the basis of said signals, the driving means 6 will drive the stabilisation element 4 at a speed and in a direction which may or may not be varied, whilst the moving means 10 will also move the rotating stabilisation element 4 in the longitudinal direction X in the guide 10 at a certain speed.

Figure 4:
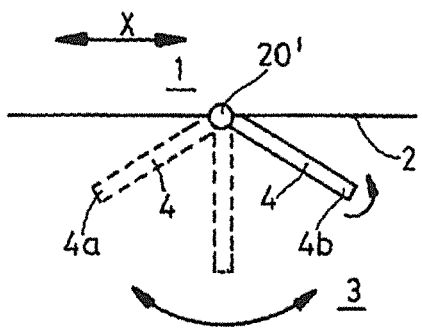

In FIG. 4 another embodiment of a known active stabilisation system is shown, in which the moving means (indicated at 20 here) impart a reciprocating pivoting movement between two extreme positions 4a and 4b with respect to the stationary ship 1 to the stabilisation element 4. In order to ensure that the active stabilisation system will function adequately with stationary ships, it is desirable, also in the embodiment shown in FIG. 4, that the pivoting movement imparted to the rotatable stabilisation element 4 by the moving means 20 should comprise at least a motion component in the longitudinal direction X of the ship 1.

In the above setup, using a suitable control and drive of the stabilisation element 4 in terms of rotational speed, direction and pivoting speed and direction, the Magnus effect in the case of a stationary ship being at anchor will for example result in a Magnus force $F_M$ comprising at least a force component in the direction of or away from the water surface 3. Said upward or downward, as the case may be, force component of the Magnus force $F_M$ can be utilised very effectively for compensating the roll of the stationary ship about its longitudinal axis X.

A major drawback of the currently known active stabilisation systems that function on the basis of the Magnus effect is that at present they can only be used with stationary ships. At present a stabilisation device based on the Magnus effect which can be used with ships that sail at a high speed is not available yet. In addition to that, a higher frictional resistance is experienced while sailing, which renders the known systems unsuitable.

Figure 5:
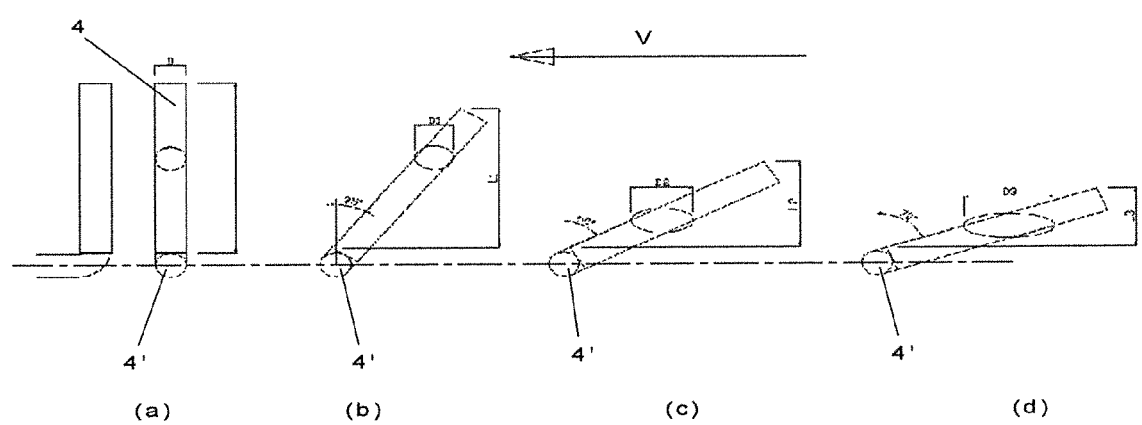
FIGS. 5-8 show various views of embodiments of a roll stabilisation system according to the invention.

FIG. 5 shows an alternative embodiment of an active stabilisation system according to the invention. In contrast to systems that can only be used with stationary ships, this stabilisation system is suitable in particular for ships while sailing. According to the invention, the active stabilisation system is characterised in that the moving means for realising a minimum resistance while the ship is sailing set the stabilisation element at an angle relative to a longitudinal axis of the ship on the basis of the control signals being delivered and the speed of the ship.

Unlike the prior art stabilisation systems, in which the rotating stabilisation elements extend at an angle of at most 90 degrees to the ship's hull, the angle relative to the ship's hull (and the ship's direction of movement) is adapted when using the present invention, so that on the one hand the resistance of the water flowing past the stabilisation elements is minimised and on the other hand the roll stabilisation is optimised.

The fact that less resistance from the water flowing past the rotating stabilisation elements is experienced, which resistance can be minimised by changing the angular setting, whilst at the same time the desired roll stabilisation effect of the stabilisation elements will be optimised, can be explained in more detail with reference to FIGS. 5 and 6.

Figure 6:
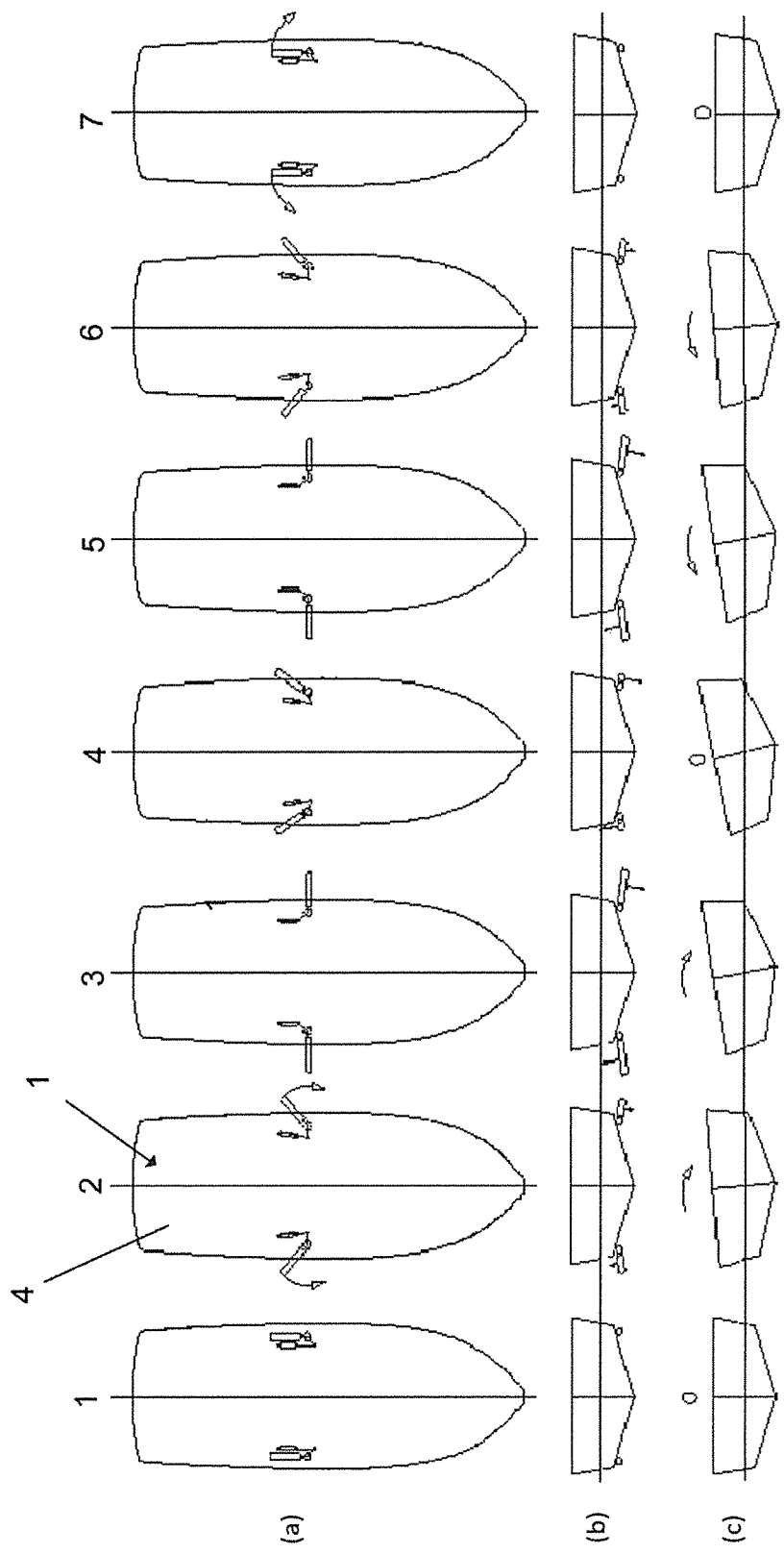

FIGS. 5 and 6 show a cylindrical stabilisation element, which forms part of an active roll stabilisation system according to the invention.

By setting the angle in dependence on the desired roll stabilisation effect and the sailing speed of the ship, an effective reduction of the resistance being experienced is realised.

In the first place this can be explained on the basis of the projected surface area of the rotating stabilisation element, i.e. the surface area of the stabilisation element along which the water is to flow. Said projected surface area is greatest when the stabilisation elements extend perpendicularly to the ship's hull and depends on the angle between the stabilisation element and the water flowing past. In addition, resistance is minimised by the angular setting in that, seen in the ship's direction of movement, the section of the stabilisation element along which water flows will no longer be cylindrical but elliptic with such an angular setting. As a result, a better "streamline" for the water flowing past is obtained, so that less resistance will be experienced.

In addition to that it has been found that as the angle relative to the ship's direction of movement (see FIGS. 5a-5b-5c-5d) increases, the surface area of the elliptic section will likewise increases.

FIG. 6 shows by way of illustration the surface area increase realised by the elliptic shape as the angle increases. The ratio L/D (the so-called Aspect Ratio, being the relation between the length and the thickness of the stabilisation element) remains identical, but the flow contact area determined by the diameter (or section) D and the projected length L-L1-L2-L3 (see FIGS. 5a-5b-5c-5d) of the stabilisation element now set at an angle, and consequently the resistance the stabilisation element experiences from the water, will decrease significantly as the angle is increased from situation 5a to situation 5d.

Although the effective projected length L-L1-L2-L3 of the stabilisation element decreases as the angle increases, and consequently also the effectiveness of the compensation of the roll stabilisation generated by this rotating stabilisation element, this decrease in the effectiveness of the roll stabilisation is corrected by the increased elliptical section (or diameter) D-D1-D2-D3 of the stabilisation element. Said elliptical section D-D1-D2-D3 that is in contact with the flow, which likewise increases as the angle increases, provides an additional lifting moment for the roll stabilisation, so that the rotating stabilisation element will be able to generate a sufficiently strong Magnus effect for correcting the roll stabilisation also in the case of larger angles.

The angular settings of 0°-35°-60°-70° relative to the ship's direction of movement V (being 90°-55°-30°-20° relative to the longitudinal axis of the ship 1) shown in FIGS. 5a-5d are purely intended by way of example for showing the effect of the enlarged elliptical section on the correction of the roll stabilisation.

The advantage of this stabilisation control is that the stabilisation system can be active at all times while sailing, independently of the sailing speed, and that the frictional resistance experienced by the stabilisation elements experience is considerably less than the frictional resistance experienced by a prior art stabilisation system, in which the stabilisation elements take up a fixed (perpendicular) position relative to the ship's direction of movement and are thus not constantly adjusted.

In FIGS. 7a-7e there is shown another embodiment of a stabilisation system according to the invention which has the same stabilisation functionality. In order to further reduce the resistance in the water of the stabilisation elements 4, the shape of the element has been adapted in this embodiment. Cylindrical stabilisation elements are no longer used in this embodiment, but the stabilisation element 4 has a wing shape 42a which is connected to a supporting part 41 of the stabilisation element, which in turn is connected to the universal joint 4' (which is driven by a drive shaft 4" of the driving means 6, see FIG. 1).

Figure 7:
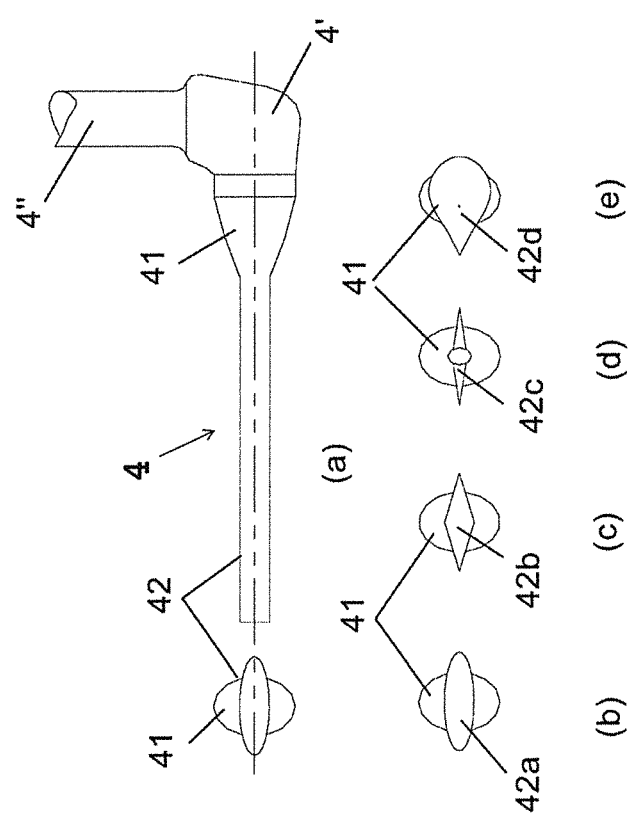

The wing 42 may have an elliptic shape 42a (FIGS. 7a and 7b), a triangular shape 42b-42c or a teardrop shape 42d (FIG. 7e).

The stabilisation system according to the invention is provided with an adaptive control system, wherein the sensor means are designed to determine the current sailing speed. This current sailing speed is compared to a reference sailing speed, which is determined in particular by the design of the ship and its roll behaviour. on the water. The control system is designed to generate control signals on the basis of said comparison and deliver them both to the driving means, which set the rotational speed of the stabilisation element, and to the moving means, which arrange the angular setting relative to the ship's direction of movement.

The control system is in particular are designed so that if the current sailing speed of the ship is lower than the reference sailing speed, the driving means will drive the stabilisation elements at a rotational speed higher than 0 rpm. Optionally the moving means can set the stabilisation elements at an angle relative to the ship's direction of movement, depending on the desired minimisation of the frictional resistance being experienced from the water.

At high sailing speeds, the rotating stabilisation element experiences too much frictional resistance, which can no longer be minimised by changing the angular setting. The control system according to the invention is therefore set so that if the current sailing speed of the ship is higher than the reference sailing speed (which has been defined on the basis of the design and roll behaviour for that type of ship), the driving means will drive the stabilisation element at a rotational speed equal to 0 rpm and the moving means will impart a reciprocating pivoting movement to the stabilisation element, which no longer rotates and is in the "feathering" position at that stage.

This additional functionality of the active stabilisation system make it possible to bring about quick and efficient adaptations to changing sailing conditions, so that on the one hand adequate corrections are constantly made for the ship's roll and on the other hand the water resistance of the ship is minimised.

At high sailing speeds the wing profile, where the non-rotating stabilisation element has a profile which generates or experiences only a minimum resistance in the "feathering" position, is clearly advantageous. At low speeds the stabilisation element can be taken out of the "feathering" position by imparting a rotational speed thereon, as a result of which the water mass is converted into a virtual cylinder, so that as a result a Magnus effect sufficiently strong for correcting the roll stabilisation is generated.

Figure 8:
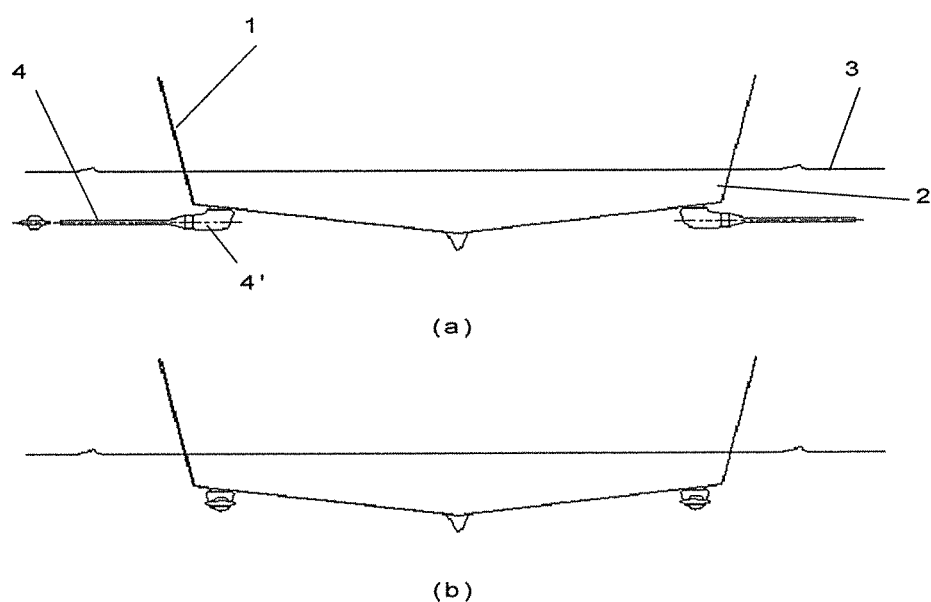

The control system is such that at higher speeds the rotation of the stabilisation elements (effected by the driving means) can be automatically converted into a pivoting movement (by the moving means) about the feathering position, so that a lifting effect can be generated from the angular displacement of the stabilisation element through, for example, −20° to +20°. The continuous adjustment of this pivoting angle is carried out by the electronics of the control system. See FIG. 8a.

In situations in which the stabilisation system need not be constantly active, the wing-shaped rotating stabilisation element is parked in the feathering position (rotation=0 rpm), so that hardly any resistance is experienced. In the feathering position, the stabilisation element "cuts" through the water without any friction, as it were. See FIG. 8b.

With the stabilisation systems according to the prior art, in which the stabilisation elements extend at right angles to the ship's direction of movement, the practical sailing speed (the reference speed as indicated above) is limited to around 14-16 knots; said speeds can be significantly increased by putting the wing-shaped stabilisation element in its "feathering" position.

The invention claimed is:

1. A method for actively damping a ship's motion while the ship is sailing by driving at least one first rotatable damping element that extends from the ship's hull, below the water line, on a side of the ship, comprising the steps of:
   i) sensing the ship's motion and sailing speed,
   ii) generating and delivering control signals on the basis of step i),
   iii) rotatably driving the stabilization elements on the basis of step ii),
   iv) determining, on the basis of step i), the current frictional resistance experienced by the stabilization elements at the sensed motion and sailing speed of the ship,
   v) setting the stabilization element at an angle relative to a longitudinal axis of the ship on the basis of the determined current frictional resistance and a desired minimum frictional resistance.

2. A method according to claim 1, wherein the at least one rotatable stabilization element has a wing shape, and wherein the method comprises the further steps of:
   at sailing speeds of the ship lower than a reference sailing speed
   vi) driving the stabilization element at a rotational speed of more than 0 rpm, or
   at sailing speeds of the ship higher than the reference sailing speed
   vii) driving the stabilization element at a rotational speed equal to 0 rpm, and
   viii) pivoting the non-rotating stabilization element to and fro.

3. A method according to claim 2, wherein the step viii) of pivoting the non-rotating stabilization element to and fro takes place between −20° and +20°.

4. A system for actively damping a ship's motion, comprising at least
   one first rotatable damping element extending from the ship's hull, below the water line, on a side of the ship,
   sensor means for sensing the ship's motion and delivering control signals on the basis thereof,
   driving means for rotatably driving the stabilization element on the basis of the control signals being delivered for the purpose of damping the ship's motion being sensed,
   wherein the sensor means furthermore are an tinged in sensing the ship's speed as well as the current frictional resistance experienced by the stabilizing elements and the system furthermore comprising
   moving means which position the stabilization element at an angle relative to a longitudinal axis of the ship on the basis of the delivered control signals and the speed of the ship and the determined current frictional resistance so as to realize a minimal resistance while the ship is sailing.

5. An active stabilization system according to claim 4, characterized in that the stabilization element has a wing shape.

6. A system actively damping a ships motion, comprising at least
   one first rotatable damping element extending from the ship's hull, below the water line, on a side of the ship,
   sensor means for sensing the ship's motion and delivering control signals on the basis thereof,
   driving means for rotatably driving the stabilization element on the basis of the control signals being delivered for the purpose of damping the ship's motion being sensed, as well as
   moving means which position the stabilization element at an angle relative to a longitudinal axis of the ship on the basis of the delivered control signals and the speed of the ship and the determined current frictional resistance so as to realize a minimal resistance while the ship is sailing,
   characterized in that the sensor means are designed to determine the current sailing speed and comparing said current sailing speed with a reference sailing speed and delivering control signals to the driving means and the moving means, respectively, on the basis of this comparison, such that if the current sailing speed is lower than the reference sailing speed, the driving means will drive the stabilization element at a rotational speed of more than 0 rpm, and that if the current sailing speed is higher than the reference sailing speed, the driving means will drive the stabilization element at a rotational speed equal to 0 rpm and the moving means will pivot the non-rotating stabilization element to and fro.

7. An active stabilization system according to claim 4, characterized in that the stabilization element is connected to the ship by means of a universal joint.

8. An active stabilization system according to claim 4, characterized in that the stabilization element can be accommodated in a recess provided in the ship's hull.

9. An active stabilization system according to claim 4, characterized in that at least one stabilization element is provided on either longitudinal side of the ship.

* * * * *